United States Patent Office 3,112,344
Patented Nov. 26, 1963

3,112,344
N-(N'-CYCLOPROPYL-N'-BENZYL-AMINOALKYL)-
SUBSTITUTED AMIDES
Bruce Wayne Horrom and Leo Ralph Swett, Waukegan,
Ill., assignors to Abbott Laboratories, North Chicago,
Ill., a corporation of Illinois
No Drawing. Filed Nov. 22, 1961, Ser. No. 154,327
3 Claims. (Cl. 260—562)

This invention is concerned with new compounds of the formula

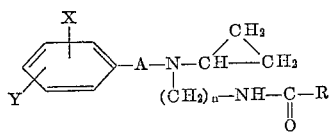

and methods for their preparation. In this and succeeding formulas, X and Y are each independently selected from the group consisting of hydrogen, chlorine, bromine, loweralkyl, loweralkoxy, amino, hydroxy and monoloweralkylamino, A is methylene or ethylene, $n$ is a number from 2 to 4 inclusive and R is hydrogen or loweralkyl. The terms "loweralkyl" and "loweralkoxy" as employed herein refer to the alkyl and alkoxy radicals containing from 1 to 4 carbon atoms, inclusive.

The novel compounds are very effective monoamine oxidase inhibitors and are therefore useful in counteracting the annoying symptoms of depression in warm blooded animals. They can be administered orally per se or admixed with a non-toxic, liquid or solid pharmaceutical carrier by means well known to those skilled in the art. In a representative operation, complete inhibition of monoamine oxidase was obtained in mice when N-cyclopropyl-N-(β-formylaminoethyl)-benzylamine was administered orally at a dosage of from 25 to 50 mg. per kg. of body weight. Such compounds are also important intermediates and can be readily reduced with LiAlH$_4$ to form other monoamine oxidase inhibitors of the formula

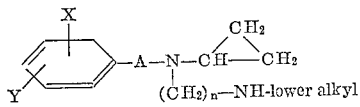

The compounds of this invention can be prepared by simply refluxing one molecular proportion of an amine of the formula

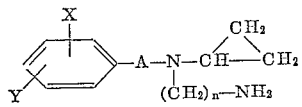

with at least one molecular proportion of an ethyl ester of the formula

or an acid chloride of the formula

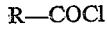

When the reaction is complete, any excess ethyl ester or acid chloride is removed and the residue fractionally distilled to obtain the desired compound as a colorless liquid.

The following examples are presented by way of illustration rather than limitation.

EXAMPLE 1

N-Cyclopropyl-N-(β-Formylaminoethyl)-Benzylamine

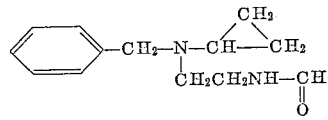

A mixture of 49 grams (0.25 mole) of N-cyclopropyl-N-(β-aminoethyl)-benzylamine and 29 grams (0.40 mole) of ethyl formate was refluxed for 24 hours. The excess ethyl formate was then removed and the residue fractionally distilled to obtain the desired formyl derivative which boiled at 164°–166° C. at 0.6 mm. pressure and had a refractive index of $n_D^{25}$ of 1.5361.

EXAMPLE 2

In the same manner as that described in Example 1, N-cyclopropyl-N-(γ-aminopropyl)-benzylamine was reacted with ethyl formate to obtain N-cyclopropyl-N-(γ-formylaminopropyl)-benzylamine of the formula

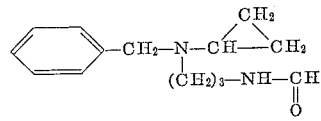

which boils at 172° C. at 0.7 mm. pressure and has a refractive index $n_D^{25}$=1.5324.

In like manner, any compound of the formula

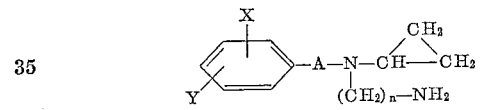

can be reacted with ethyl formate, ethyl acetate, ethyl propionate, ethyl butyrate or a loweralkyl acid chloride to obtain the corresponding substituted N-cyclopropyl-N-benzylamines of the formula

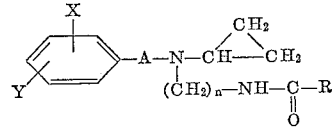

The cyclopropylbenzylamines and cyclopropylphenylethylamines employed as starting materials in the present invention can be prepared by reaction at room temperature of equimolecular proportions of cyclopropylamine with an aldehyde of the formula

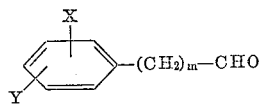

wherein $m$ is 0 or 1 followed by distillation of the reaction mixture to obtain an intermediate of the formula

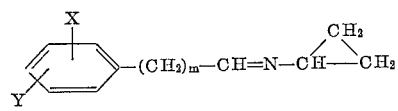

which is readily reduced with hydrogen at room temperature in the presence of a palladium catalyst. The boiling point of some of these amines is as follows:

| Amine: | B.P. in ° C. |
|---|---|
| N-cyclopropylbenzylamine | 81/5 mm. |
| N-cyclopropyl-N-o-bromobenzylamine | 110/3.5 mm. |
| N-cyclopropyl-N-p-chlorobenzylamine | 78/0.1 mm. |
| N-cyclopropyl-N - 3,4 - dichlorobenzylamine | 98/0.8 mm. |

What we claim is:
1. Compounds of the formula

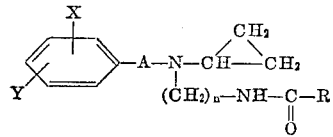

wherein X and Y are each independently selected from the group consisting of hydrogen, chlorine, bromine, loweralkyl, loweralkoxy, amino, hydroxy and monoloweralkylamino, A is a loweralkylene radical, $n$ is a number from 2 to 4 inclusive and R is a member of the group consisting of hydrogen and loweralkyl.

2. N-cyclopropyl-N - ($\beta$ - formylaminoethyl) - benzylamine.

3. N-cyclopropyl-N-($\gamma$ - formylaminopropyl) - benzylamine.

References Cited in the file of this patent
UNITED STATES PATENTS
2,453,057   Zienty _____ Nov. 2, 1948

OTHER REFERENCES
Surrey et al.: Jour. Am. Chem. Soc., vol. 77, pp. 3798–3799 (1955).